Patented Mar. 18, 1930

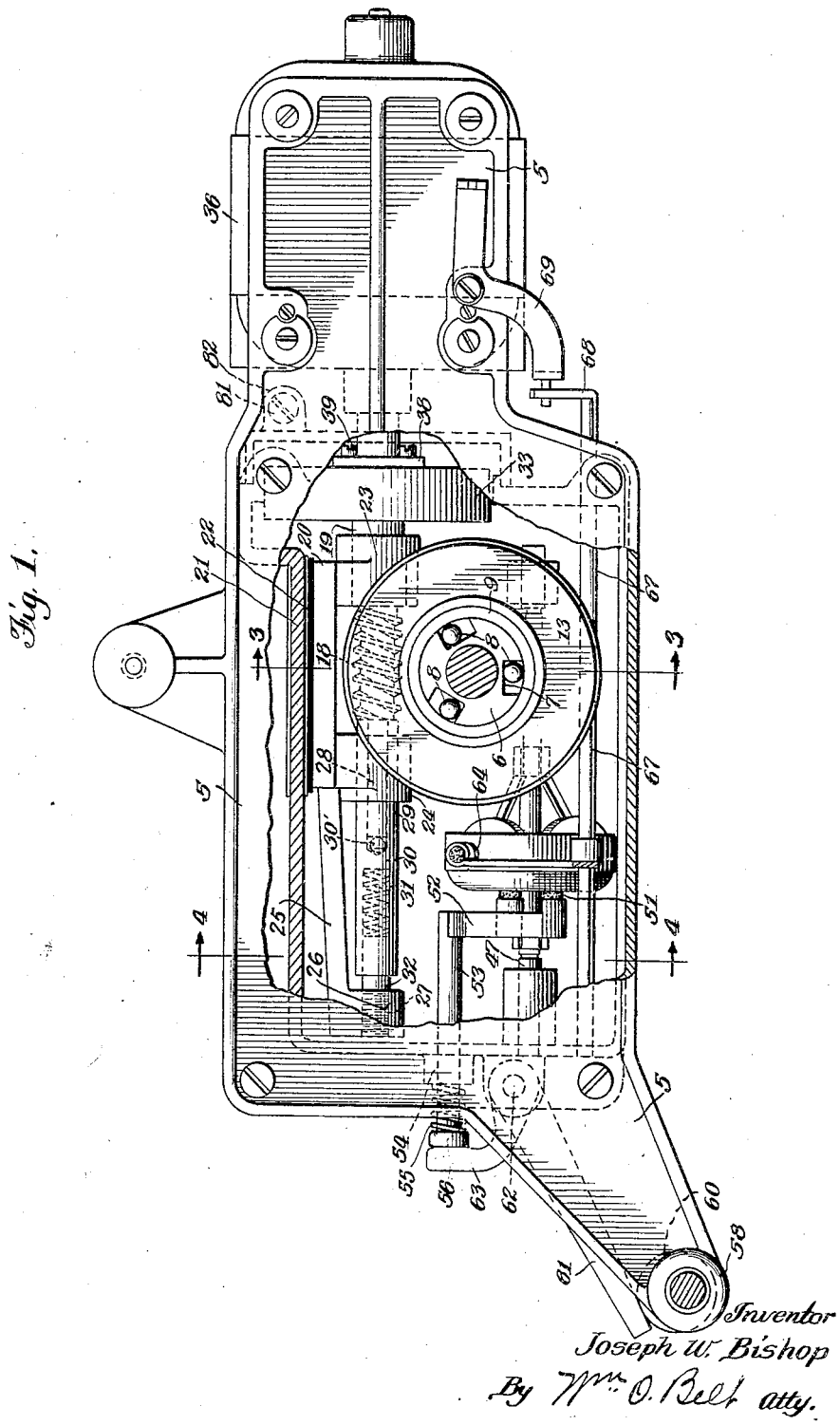

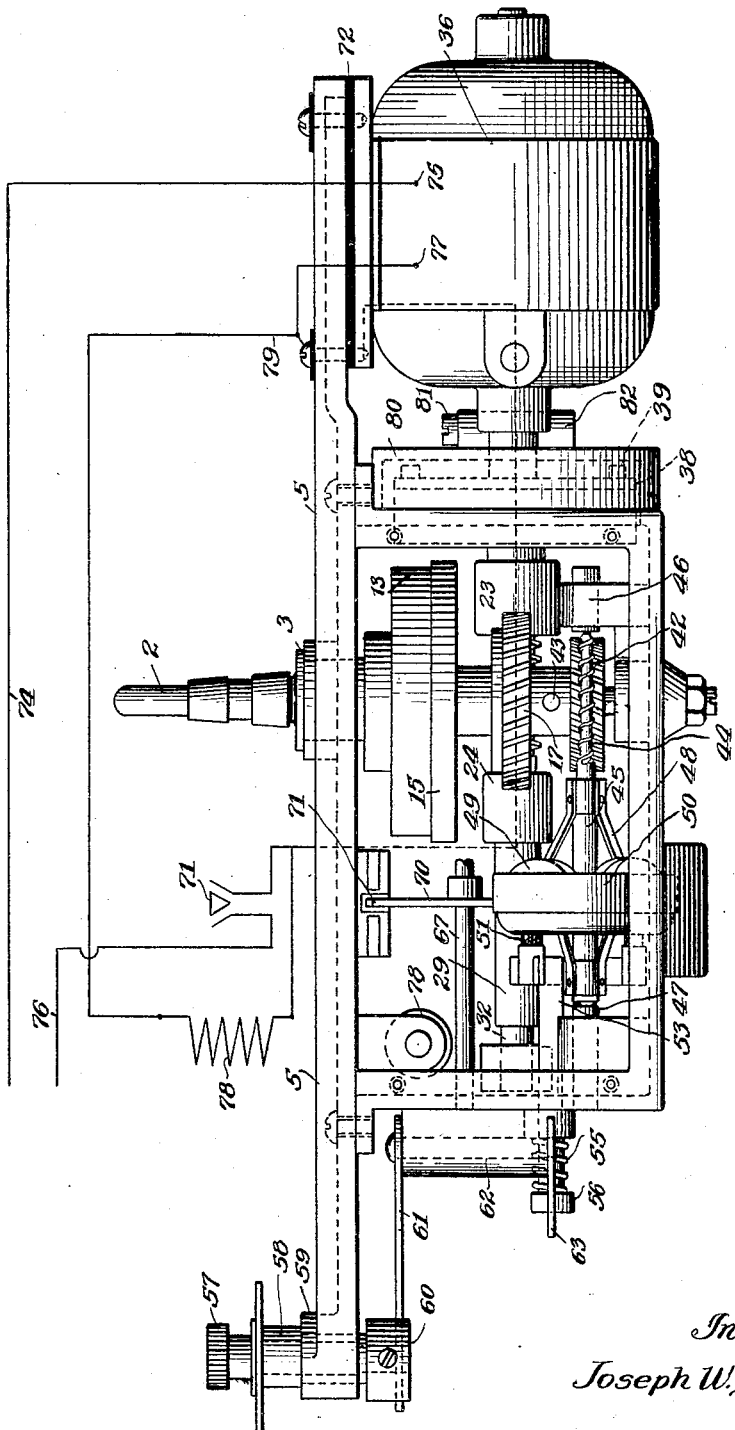

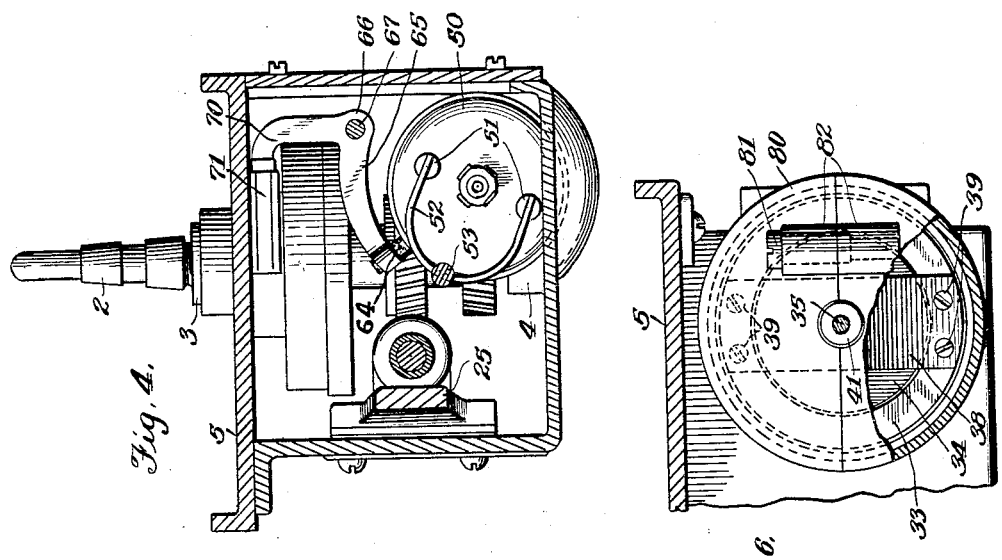

1,750,920

UNITED STATES PATENT OFFICE

JOSEPH W. BISHOP, OF MUSKEGON, MICHIGAN, ASSIGNOR TO THE BRUNSWICK-BALKE-COLLENDER COMPANY, OF CHICAGO, ILLINOIS, A CORPORATION OF DELAWARE

MOTOR

Original application filed September 29, 1921, Serial No. 504,097. Divided and this application filed August 2, 1926. Serial No. 126,404.

My invention relates to power drive mechanisms, and has particular relation to phonograph drives of the type described in my copending application Serial No. 504,097 filed Sept. 29, 1921, of which this application is a division. One object of the invention is to provide mechanism whereby the turn table may be driven at a constant speed by a motor having a variable speed.

Another and a more specific object of the invention is to provide means enabling an electric motor whose speed varies with the fluctuations in the line to drive the table of the phonograph at a constant speed.

Further objects of the invention will become apparent as the description is read in connection with the accompanying drawing wherein I have shown a selected embodiment by way of illustration and in which—

Fig. 1 is a plan view with certain portions of the casing for driving mechanism broken away;

Fig. 2 is a side elevation with a portion of the housing removed and indicating the wiring diagram;

Fig. 3 is a transverse section on the line 3—3 of Fig. 1;

Fig. 4 is a transverse section on the line 4—4 of Fig. 1;

Figs. 5 and 6 are a longitudinal section and an end elevation respectively of the clutch between the motor and the transmission.

Referring to the reference characters on the drawing 1 indicates the turn table on which the record is carried. This table is mounted on the spindle 2 in the usual, or any suitable manner, and the spindle is journalled in the bushing 3 and thrust bearing 4 carried by the motor frame, or in any other manner desired. Just below the top plate 5 the spindle 2 is equipped with a flange 6 having therein a plurality of inclined seats 7 adapted to receive balls or rollers 8. The flange 9 of a bushing 10 surrounds the flange 6 and forms with the balls and the inclined faces of the notches, a clutch of familiar operation. The extension 11 of the bushing 10 is secured to the inner end of the spiral spring 12 having its outer end fastened to the cylindrical casing 13 which latter has a cylindrical hub 14 telescoping with the flange 9 and is rigidly secured to the disc 15 having the hub 16 journalled on spindle 2 and equipped with the worm gear 17 meshing with the worm 18 carried by the horizontal shaft 19. The shaft 19 is carried by a bracket 20 secured to the side 21 of the casing and insulated therefrom by the fiber or other non-conducting strip 22.

The bracket 20 is equipped with the cylindrical bearings 23 and 24 and has an arm 25 terminating in a head 26 provided with a threaded opening 27 in alignment with the shaft 19. The bearing 23 receives the shaft 19 directly while the opposite end of the shaft is reduced as shown at 28 and journalled in a sleeve 29 carried by the bearing 24. The sleeve has a seat 30 for a ball 30' which forms a bearing for one end of the spring 31 which is compressed by a screw 32 threaded into the socket 27. The opposite end of the shaft 19 is equipped with a cup-shaped clutch member 33 (Fig. 5) which is adapted to receive the complemental clutch member 34 secured to the shaft 35 of the motor 36. The clutch member 34 is faced with a disc 37 of carbon, copper or other suitable material so that it will not only transmit torque but will provide an effective connection for transmission of electric current. A strip of rubber 38 is secured to the clutch member 33 by screws 39 and has an opening 40 for the hub 41 of the clutch member 34. Below the worm gear 17 the spindle 2 is equipped with a second worm gear 42 secured thereto by a pin 43 or in any other suitable manner and meshing with the worm 44 on the governor shaft 45 which is journalled in the bearings 46 and 47 in any suitable manner. The governor is of familiar ball type having springs 48 carrying weights 49 and is equipped with a drum 50 adapted to move to the left in Fig. 2 as the speed of the spindle 2 increases to eventually bring the side of the drum 50 into contact with the brake pads 51 carried by the yoke 52 (Fig. 4) which is fixed to the push rod 53 (Fig. 1) slidably mounted at 54 in the frame of the machine and urged away from the brake drum by a spring 55 compressed between the collar 56 on the rod 53 and the frame. The pads 51 are located in position to limit the speed of the motor as required. By turning the knob 57 (Fig. 2) carried by the shaft 58 journalled in the frame at 59 and equipped at 60 with an eccentric adapted to bear on the arm 61 of a bell crank lever pivoted at 62 and having a second arm 63 contacting with the collar 56 of the push rod 53, the position of the brake pads 51 may be adjusted to suit conditions. The brake 64 for stopping the turn table is carried by the arm 65 of a bell crank 66 carried by the shaft 67 (Figs. 1 and 4), having an arm 68 engaged with the control lever 69. The bell crank lever 66 has another arm 70 (Figs. 2 and 4) adapted to open a switch 71 when the brake is applied and to close the switch when the brake is released. The motor 36 is insulated from the frame by non-conducting substance 72 in a well understood manner.

The wiring diagram is indicated in Fig. 2. 74 is one side of the line connected to the motor at 75. 76 is the other side of the line connected to the switch 71 which is electrically connected with the worm shaft 19 through which the current passes as indicated in the dotted line and if the clutch shown in Fig. 5 is engaged, the current will pass through into the shaft 35 of the motor and thence through the motor casing to the other binding post 77. A suitable resistance coil 78 is shunted between the binding post 79 and the switch 71 to prevent arcing in the clutch.

In operation, the control lever 69 is moved to release the brake 64 and close the switch 71. The spring 31 and the rubber strip 38 normally hold the clutch member 33 in contact with the carbon or copper disc 37. Consequently, when the circuit is closed, the current is allowed to flow from one side 76 of the line through the switch 71, the shafts 19 and 35 and the motor 36, back to the opposite side 74 of the line. The motor 36 therefore drives the shaft 19 and the worm 18 communicates the rotary motion to the worm gear 17 which drives the bushing 10 through the spring 12, and through the clutch transmits motion to the spindle 2 carrying the table 1. An indicator is placed on the record table and the knob 57 is turned until the table is limited to the desired speed which is well within the capacity of the line under all ordinary conditions.

If the line builds up, the motor will accelerate and will tend to increase speed of the spindle 2 through the worm gearing, the helical spring 12 and the ball clutch. But an increase of torque on the worm increases its thrust against the spring 31 as well as the force applied to the spring 12; and, with properly adjusted and proportioned parts, the worm will be permitted sufficient movement to both relieve the clutch 33—34 and thus insert resistance in the circuit while spring 12 takes up the additional impulse, and the action of the governor brake and the inertia of the revolving parts prevent any perceptible increase in speed. Only a slight movement of the worm is sufficient to allow the clutch 33—34 to slip and thus to cut down the power to the motor 36. The result is that the device can be made so sensitive to an increase of torque from the motor 36 that it will immediately relieve the clutch and thus reduce the current.

I have found it very satisfactory to make the spring 12 of sufficient length and power that it, under sufficient tension, will drive the table about ten revolutions without running down, but of course, springs of different length and strength may be used. This capacity is ample to provide the necessary absorption for the added torque and to supply sufficient impulse to drive the spindle during the intervals of interrupted drive from the motor. The spring 12 thus serves as a driving connection and also as an auxiliary motor and a compensator.

The compression of spring 31 is adjusted by the screw 32 and by proper selection and adjustment this spring will be so sensitive to an increase of thrust on the worm that it will permit the circuit to be broken before any change in speed can be detected at the table.

In Figs. 5 and 6 I have shown the clutch housed by a suitable cap 80 made in two pieces and secured together by a bolt 81 passing through the bosses 82.

The clutch between the spindle 2 and the bushing 9 will permit the table to be freely rotated in one direction when the brake 64 is on, without putting any strain on the spring 12 or any other part of the mechanism, while rotation in the other direction merely winds the spring. When the spring is fast with respect to the spindle, it is a very easy matter to cause serious injury to the spring or to the other parts, or both, by rotating the table in the wrong direction.

I have shown a shoulder on the shaft 19 resting against the end of the sleeve 30, but it is to be understood that I may provide any suitable kind of thrust bearing instead.

The worm gears 17 and 42 are preferably made of fiber, bakelite, or the like, so as to be non-conducting as well as having the other desirable features of such material.

The resistance 78 is sufficient to prevent any arcing between the disc 37 and the clutch member 33, but is not so great as to preclude the passage of current sufficient to keep the motor running.

In normal operation of the device it will be understood that the longitudinal movement of the shaft 19 is not very great, nor does it continue through any great period of time. As a matter of fact, the intervals in which the circuit is broken by longitudinal movement of this shaft are very short and the corresponding intervals during which the motor is idling and the spring 12 is driving the table are likewise brief. This intermittent action between the motor and the turn table is sufficient to prevent the motor from increasing the speed of the turn table beyond the desired constant, and at the same time it does not permit the turn table to slow down below this constant.

In practice it has been found possible, by using my invention, to drive a turn table at a uniform velocity notwithstanding large fluctuations of voltage in a direct current motor.

I am aware that changes in the form, proportion and construction of the various parts may be made without departing from the spirit of the invention and I therefore reserve the right to make all such changes as may fairly fall within the scope of the following claims.

I claim:—

1. The combination with an electric motor having a driving shaft of a driven shaft, means actuable when the torque of said driven shaft rises beyond a predetermined point to decrease the power transmitted to said driven shaft, said means permitting said motor to rotate said driven shaft when the torque on said driven shaft falls below said predetermined point, an additional shaft and a resilient connection between said driven shaft and said additional shaft for compensating for variations of speed of said driven shaft whereby said additional shaft is rotated at a uniform speed by said motor.

2. The combination with an electric motor having a driving shaft, of a driven shaft, means actuable when the torque of said driven shaft rises beyond a predetermined point to decrease the power transmitted to said driven shaft, said means permitting said motor to rotate said driven shaft when the torque of said driven shaft falls below said predetermined point, an additional shaft, a resilient connection between said driven shaft and said additional shaft for compensating for variations of speed of said driven shaft and a governor for controlling the speed of said additional shaft, whereby said additional shaft is rotated at a uniform speed by said motor notwithstanding variations of speed of said motor.

3. The combination with an electric motor having a driving shaft of a circuit including said motor, a driven shaft, means actuable when the torque of said driven shaft rises beyond a predetermined point for decreasing but not discontinuing the flow of current through said motor, an additional shaft and means including a resilient connection between said driven shaft and said additional shaft for compensating for variations of speed of said driven shaft.

4. The combination with an electric motor having a driving shaft of a driven shaft, means actuable when the torque of said driven shaft increases beyond a predetermined point for interrupting the transmission of power from said driving shaft to said driven shaft, said means permitting said motor to rotate said driven shaft when the torque on said driven shaft falls below said predetermined point, an additional shaft and a resilient connection between said driven shaft and said additional shaft for compensating for variations of speed of said driven shaft.

5. The combination with a continuously running electric motor having a driving shaft of a driven shaft, a clutch for transmitting power from one of said shafts to the other, means for maintaining said clutch in operative position, said means being operative, when the torque on the driven shaft increases beyond a predetermined point to permit said clutch to be thrown out but operative when the torque on the driven shaft decreases below said predetermined point to throw said clutch in, an additional shaft and a resilient connection between said driven shaft and said additional shaft for driving said additional shaft at a substantially uniform rate of speed notwithstanding changes of speed of said motor.

6. The combination with a continuously running electric motor having a driving shaft of an electric circuit including said motor, a driven shaft, means actuable when the torque of said driven shaft increases beyond a predetermined point for lowering the voltage on said motor and interrupting the driving connection of said motor with said driven shaft, said means permitting said motor to rotate said driven shaft when the torque on said driven shaft falls below said predetermined point, an additional shaft and a resilient connection between said driven shaft and said additional shaft for compensating for variations of speed of said driven shaft.

7. The combination with a continuously running electric motor having a driving shaft, of a longitudinally movable driven shaft, a clutch connecting said shafts, a worm on said driven shaft, resilient means for maintaining said clutch in operative position, said means being operative on the increase of the thrust of said driven shaft beyond a predetermined point to permit said clutch to be thrown out but on the decrease of the thrust below said point to throw said clutch in, an additional shaft and driving connections including a spring between said worm and said additional shaft for compensating for changes in speed in said driven shaft, whereby said additional shaft is driven by said motor at a uniform speed.

8. The combination with a continuously running electric motor having a driving shaft, of a longitudinally movable driven shaft a clutch connecting said shafts, a worm on said driven shaft, resilient means for maintaining said clutch in operative position, said means being operative on the increase of the thrust of said driven shaft beyond a predetermined point to permit said clutch to be thrown out but on the decrease of the thrust below said point to throw said clutch in, an additional shaft, driving connections including a spring between said worm and said additional shaft and a governor coupled to said additional shaft for controlling the speed thereof.

9. The combination with a continuously running electric motor having a driving shaft, of a longitudinally movable driven shaft, a pair of clutch members connecting said shafts, an electric circuit including said motor and also including said clutch members as contacts, a worm on said driven shaft, resilient means for maintaining said clutch members in engagement, a resistance element in said circuit in shunt relation to said clutch members, said means being operative on the increase of thrust of said driven shaft beyond a predetermined point to permit said clutch to be thrown out of engagement and thus decrease the supply of electric current to said motor but on the decrease of the thrust below said point to throw said clutch in, an additional shaft, driving connections including a spring between said worm and said additional shaft for compensating for changes of speed of said driven shaft and a governor for controlling the speed of said additional shaft.

10. The combination of a drive shaft, a clutch member mounted thereon, a driven shaft mounted for longitudinal movement, a clutch on said driven shaft, and an electric circuit including said driving shaft, said clutch, and said driven shaft, said circuit including a resistance connected in parallel to said shafts and remaining in the circuit when the circuit through said shafts is interrupted on the disengagement of said clutch being closed when said clutch members are in engagement and open when said clutch members are disengaged.

11. The combination with a continuously running electric motor having a driving shaft, an electric circuit including said motor, a longitudinally movable driven shaft, a clutch connecting said shafts, said electric circuit including said shafts and being closed when said clutch is in and open when said clutch is out, a resistance element in said circuit in shunt relation to said shafts, a worm on said driven shaft, resilient means for maintaining said clutch in, said means being operative on the increase of thrust in said driven shaft beyond a predetermined point to throw said clutch out and insert the resistance in said circuit but on the decrease of the thrust below said point to throw said clutch in, an additional shaft and driving connections including a spring between said worm and said additional shaft for compensating for changes in speed of said driven shaft.

12. In a device of the class described, the combination of a rotating table, a spindle supporting said table for rotation, a governor including a governor drum coupled to said spindle, a brake movable into engagement with said drum for checking the movement thereof, an electric motor, an electric circuit for said motor, and means for simultaneously releasing said brake and closing said electric circuit.

13. In a device of the class described, a rotatable table, a motor, means for transmitting the drive of the motor to the table including a clutch, means to relieve the clutch when the motor tends to increase the speed of the table above the desired constant, and means to drive the table while the clutch is relieved.

14. In a device of the class described, a rotatable table, a spindle on which the table is mounted, a brake adapted to resist the rotation of the spindle, means to apply the brake when the speed of the spindle tends to exceed a desired constant, a motor, gearing between the motor and the spindle including a clutch, and means to relieve said clutch when the speed of said spindle tends to exceed said desired constant.

15. In a device of the class described, a spindle, a motor, a worm gear on said spindle, a worm meshing with said worm gear and adapted to move longitudinally, a spring resisting the longitudinal movement of said worm, a motor, a clutch adapted to connect said motor and said worm, and means to resist the increase in speed of the spindle above a predetermined constant.

16. In a device of the class described, a spindle, a worm gear thereon, a worm meshing with said worm gear, a sleeve against which said worm bears, a spring pressing against said sleeve, a motor, a clutch interposed between said motor and said worm, and an adjustable governor adapted to limit the speed of rotation of said spindle.

17. In a device of the class described, a frame, a table, a spindle on which said table is mounted, an electric motor, a fiber gear on said spindle, a worm meshing with said gear, a motor mounted on said frame and insulated therefrom, a clutch between said motor and said worm adapted to form part of an electric circuit including the motor, and means for automatically relieving said clutch upon an undesirable increase in the speed of the motor.

18. In a device of the class described, a frame, a motor mounted on the frame and insulated therefrom, a table, a spindle on which said table is mounted, a worm gear carried by said spindle made of non-conducting material, a worm meshing with said spindle, a shaft carrying said worm mounted for yielding longitudinal movement, means for insulating said shaft from said frame, and a clutch between said shaft and said motor.

JOSEPH W. BISHOP.